(12) United States Patent
Sartore et al.

(10) Patent No.: US 6,839,778 B1
(45) Date of Patent: Jan. 4, 2005

(54) SPEED POWER EFFICIENT USB METHOD

(75) Inventors: Ronald H. Sartore, Poway, CA (US);
Steven P. Larky, Del Mar, CA (US);
Cathal G. Phelan, Mountain View, CA (US)

(73) Assignee: Cypress Semiconductor Corp., San Jose, CA (US)

(*) Notice: Subject to any disclaimer, the term of this patent is extended or adjusted under 35 U.S.C. 154(b) by 358 days.

(21) Appl. No.: 09/590,831

(22) Filed: Jun. 9, 2000

(51) Int. Cl.[7] .................................................. G06F 13/10
(52) U.S. Cl. ................................ 710/60; 710/8; 710/14; 710/15; 710/16; 710/18
(58) Field of Search ................................ 710/8, 14, 15, 710/16, 18, 60

(56) References Cited

U.S. PATENT DOCUMENTS

| | | | | |
|---|---|---|---|---|
| 3,950,735 A | * | 4/1976 | Patel ............................ | 710/60 |
| 4,007,449 A | * | 2/1977 | Vercesi ......................... | 710/58 |
| 5,230,071 A | * | 7/1993 | Newman ....................... | 710/60 |
| 5,579,531 A | * | 11/1996 | Sugita .......................... | 710/51 |
| 5,922,056 A | * | 7/1999 | Amell et al. .................. | 710/16 |
| 6,131,134 A | * | 10/2000 | Huang et al. ................ | 710/302 |
| 6,311,245 B1 | * | 10/2001 | Klein ........................... | 710/306 |
| 6,311,287 B1 | * | 10/2001 | Dischler et al. ............ | 713/601 |

OTHER PUBLICATIONS

Universal Serial Bus Specification, Revision 2.0, Apr. 27, 2000, pp. 1–622.
Universal Serial Bus Specification, Revision 1.1, Sep. 23, 1998, pp. 1–311.

* cited by examiner

*Primary Examiner*—Rehana Perveen
(74) *Attorney, Agent, or Firm*—Christopher P. Maiorana, P.C.

(57) ABSTRACT

An apparatus comprising a peripheral device and a host device. The peripheral device may be connected to the host device. The speed of the peripheral device may be adjusted in response to one or more predetermined conditions.

19 Claims, 2 Drawing Sheets

SPEED POWER EFFICIENT USB METHOD

FIELD OF THE INVENTION

The present invention relates to a method and/or architecture for Universal Serial Bus (USB) devices generally and, more particularly, to a method and/or architecture for speed and power efficient USB devices.

BACKGROUND OF THE INVENTION

A Universal Serial Bus (USB) device establishes one operating speed during enumeration of the device and remains at the established speed indefinitely while powered. The USB device maintains the established speed regardless of whether (i) the device is switched to or from a limited power mode of operation or (ii) the speed is warranted for the actual application.

Once a device enumerates as a high speed device, the device remains at a high speed. The device operating as a high speed device has a higher power consumption than a full speed device. However, a device may remain at the high speed (high power consumption) mode, even though the high speed is sometimes not necessary. High speed devices are not battery friendly and may provide excessive capability (i.e., more speed than necessary) for some applications. Conventional approaches are not configured to change an established USB configuration.

SUMMARY OF THE INVENTION

The present invention concerns an apparatus comprising a peripheral device and a host device. The peripheral device may be connected to the host device. The speed of the peripheral device may be adjusted in response to one or more predetermined conditions.

The objects, features and advantages of the present invention include providing a method and/or architecture for implementing speed and power efficient USB devices that may provide (i) USB speed switching (e.g., USB 2.0 speed to USB 1.1 speed or vice versa), (ii) bi-directional and conditional switching, (iii) switching based upon usage requirements, (iv) switching based upon power situations and/or (v) speed switching capability not provided within USB specifications.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
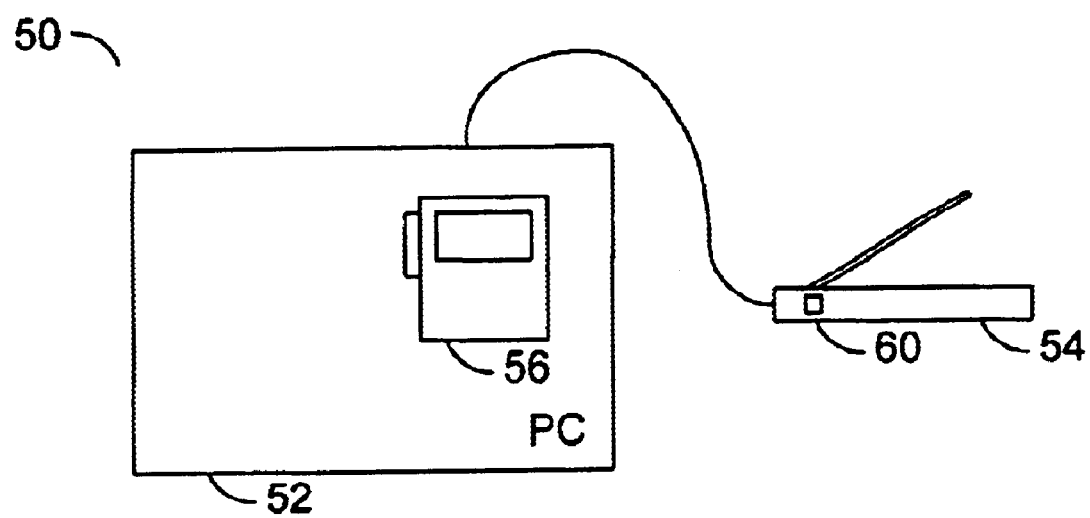
FIG. 1 is a block diagram of a preferred embodiment of the present invention.

Referring to FIG. 1, a block diagram of a system 50 is shown in accordance with a preferred embodiment of the present invention. The system 50 generally comprises a computer (e.g., a personal computer (PC)) 52 and a peripheral device 54. The system 50 may provide speed adaptive operation of the peripheral device 54. The computer 52 may include a host device or interface 56. The peripheral device 54 may include a control block (or circuit) 60. In one example, the control block 60 may be implemented as a speed/power control circuit. The control circuit 60 may interface with the host interface 56. In one example, the control circuit 60 may be embedded within the peripheral device 54. However, the control circuit 60 may be implemented as another appropriate type device in order to meet the criteria of a particular implementation.

Figure 2:
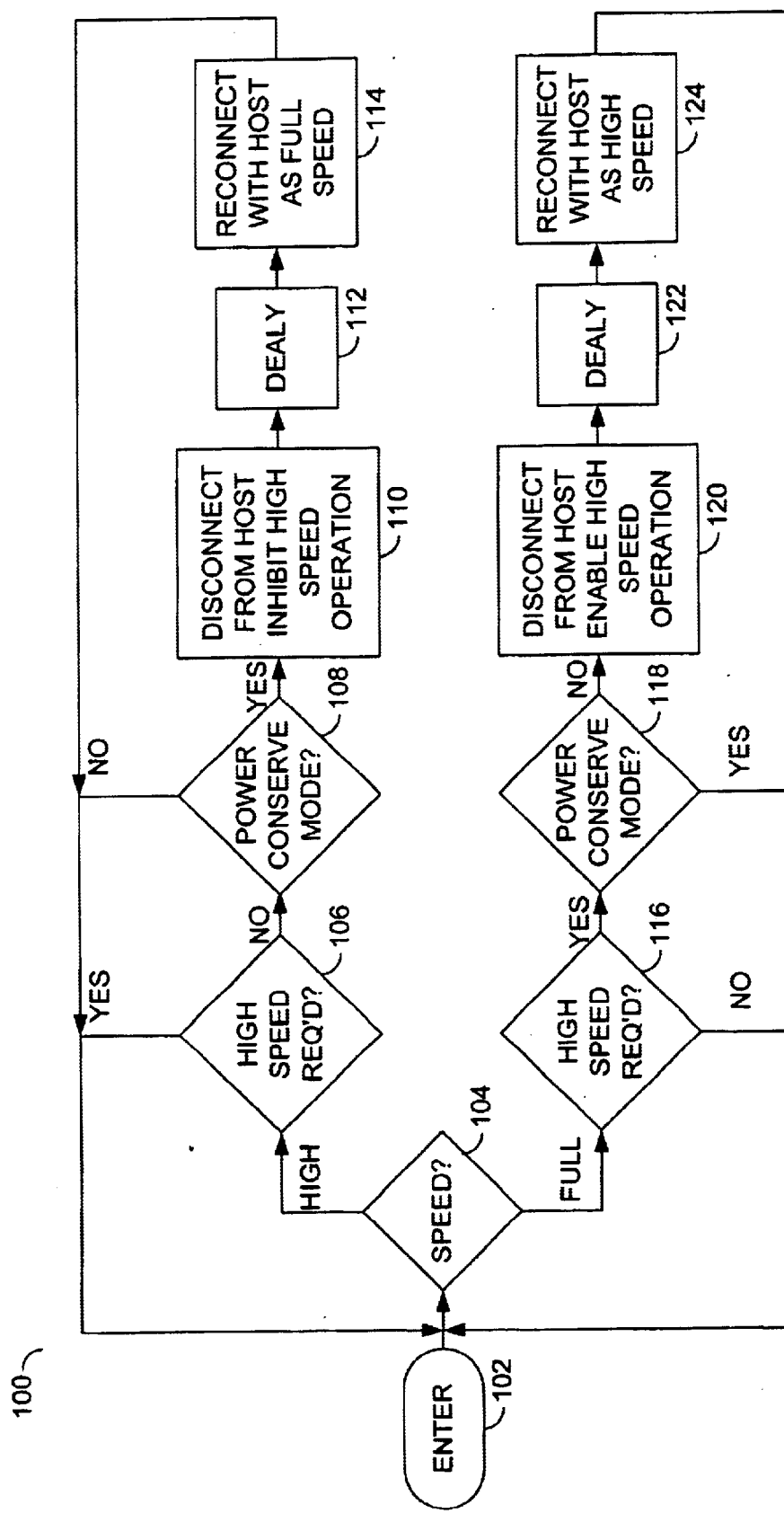
FIG. 2 is a flow chart illustrating an operation of the present invention.

Referring to FIG. 2, a diagram of a method (or process) 100 is shown in accordance with a preferred embodiment of the present invention. The method 100 generally comprises a block 102, a decision block 104, a decision block 106, a decision block 108, a block 110, a block 112, a block 114, a decision block 116, a decision block 118, a block 120, a block 122 and a block 124. In one example, the decision block 104 may be implemented as a speed detect decision block. The decision block 104 may determine a speed of operation of the peripheral device 54. If the peripheral device 54 is operating in a full speed mode, the method 100 may move to the decision block 116. If the peripheral device 54 is operating in a high speed mode, the method 100 may move to the decision block 106.

The decision block 106 may determine if the system 50 requires the high speed mode. If the system 50 requires the high speed mode, the method 100 generally returns to the speed detect decision block 104. If the circuit 50 does not require the high speed mode, the method 100 may move to the decision block 108. The decision block 108 may determine if a power conservation mode is required. If a power conservation mode is not required, the method 100 generally returns to the speed detect decision block 104. If a power conservation mode is required, the method 100 may move to the block 110.

The block 110 may electrically disconnect the peripheral device 54 from the host computer 52. The electrical disconnect may allow the method 100 to inhibit the high speed operation of the peripheral device 54. The method 100 may then move to the delay 112. After the delay 112, the method 100 may move to the block 114. The block 114 may electrically reconnect the peripheral device 54. The reconnect may allow the peripheral device 54 to operate as full speed. The method 100 then generally moves back to the speed detect decision block 104.

The decision block 116 may determine if a high speed mode is required. If a high speed mode is not required, the method 100 generally moves back to the decision block 104. If a high speed is required, the method 100 may move to the decision block 118. The decision block 118 may determine if a power conservation mode is necessary. If a power conservation mode is necessary, the method 100 generally moves back to the speed detection decision block 104. If the power conservation mode is not necessary, the method 100 may move to the block 120. The block 120 may electrically disconnect the peripheral device 54 from the computer 52. The electrical disconnect may allow the method 100 to enable a high speed operation. Next, the method 100 may move to the delay block 122. After the delay block 122, the method 100 may move to the block 124. The block 124 may electrically reconnect the peripheral device 54 with the host computer 52. The reconnect may allow the peripheral device 54 to be connected as a high speed device. The method 100 then generally moves back to the speed detection indication block 104.

The electrical disconnect and reconnect in the block 110, the block 112 and the block 114 may be implemented as a re-enumeration as described in U.S. Pat. No. 6,012,103, which is hereby incorporated by reference in its entirety. As part of the re-enumeration, the blocks 110, 112 and 114 may also change the speed of operation of the peripheral device 54. Similarly, the blocks 120, 122 and 124 may also provide a re-enumeration process. As part of the re-enumeration, the blocks 120, 122 and 124 may also change the speed of operation of the peripheral device 54.

The system 50 (or method 100) may allow USB peripheral devices, via the re-enumeration concept, to switch between (i) a high performance, high power modes of operation and (ii) a lower speed, power conservation modes of operation. The system 50 may allow a number of criteria (or conditions) to initiate a change from a high speed mode to a low speed mode or vice-versa. For example, criteria such as whether battery operation is in use or whether a particular performance is warranted based on actual use may be used to initiate the mode changes. Additionally, the system 50 may provide throttle power down to conserve power.

Upon pre-established criteria, such as going from a wall outlet power source to a battery power source, the system 50 (or method 100) may permit a USB device to electrically disconnect and reconnect at a slower, power saving speed. Also, the system 50 (or method 100) may permit the changing from a high speed USB device to a full speed USB device, should the data traffic be judged to be capably handled by the slower, full-speed data rates. Conversely, the system 50 (or method 100) may change from a full speed USB device to a high speed USB device, should the data traffic be judged to be better handled by the faster, high-speed data rates.

Since many USB peripherals are bus powered (e.g., receive power via the host 52) many applications, such as laptop computers can enjoy increased battery life through power conservation at the peripheral level. High speed USB implementations generally consume more peripheral power due to the high data rates and internal clock speeds required. However, the speed/power trade off may not be applicable for all low power applications.

The system 50 (or 100) may provide a USB peripheral capable of high speed USB operation (e.g., USB 2.0), that may, upon a host or peripheral command, electrically disconnect and reconnect as a full speed device. Additionally, a USB peripheral capable of high speed USB (e.g., USB 2.0), that is operating in the full speed mode (but near the limits of the full speed performance capability) may be electrically disconnected and reconnected as a high speed device.

The system 50 may adjust a speed of a peripheral device based on conditions such as power source, optional speed (e.g., 480 Mbs to 12 Mbs), when battery operated, etc. The speed adjustment may also be based on traffic needs and/or monitored data rates below a set threshold.

The system 50 may provide power management for USB devices through re-enumeration between full and high speed modes. The system 50 may allow a user to tailor an operation speed. The system 50 may extend useful operation under battery power. Battery operation duration is generally becoming an increasingly important product selection criteria. The system 50 may provide increased battery operating life, lower power consumption, cooler operation, etc. The system 50 may provide speed switching for power conservation/performance tradeoffs for USB systems through use of re-enumeration.

The function performed by the method of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
a peripheral device connected to a host device, wherein a speed of said peripheral device is adjusted in response to one or more predetermined conditions, wherein said peripheral device is further configured to switch from a first speed to a second speed in response to said one or more predetermined conditions.

2. The apparatus according to claim 1, wherein said peripheral device is further configured to electrically disconnect and reconnect at said adjusted speed to said host device.

3. The apparatus according to claim 2, wherein said electrical disconnection/reconnection comprises re-enumeration of said peripheral device.

4. The apparatus according to claim 1, wherein said peripheral device comprises a Universal Serial Bus (USB) device.

5. The apparatus according to claim 1, wherein said one or more predetermined conditions comprise one or more speed considerations and one or more power considerations.

6. The apparatus according to claim 1, wherein said apparatus is further configured to determine an operating speed of said peripheral device.

7. The apparatus according to claim 1, wherein said peripheral device is further configured to determine a power conservation of said peripheral device.

8. The apparatus according to claim 1, wherein said peripheral device is further configured to switch from a first speed to a second speed in response to a user input.

9. An apparatus comprising:
means for detecting a current operating speed of a peripheral device; and
means for changing the operating speed of said peripheral in response to one or more predetermined conditions, wherein said peripheral device is further configured to switch from a first speed to a second speed in response to said one or more predetermined conditions.

10. A method for controlling the speed of operation of a peripheral device, comprising the steps of:
(A) detecting a current operating speed of said peripheral device; and (B) changing the operating speed of said peripheral device in response to one or more predetermined conditions, wherein said peripheral device is further configured to switch from a first speed to a second speed in response to said one or more predetermined conditions.

11. The method according to claim 10, wherein step (B) further comprises the step of:

electrically disconnecting and reconnecting said peripheral device.

12. The method according to claim 10, wherein step (a) further comprises re-enumeration of said peripheral device.

13. The method according to claim 10, wherein said peripheral device comprises a Universal Serial Bus (USB) device.

14. The method according to claim 10, wherein said one or more predetermined conditions comprise one or more speed considerations and one or more power considerations.

15. The method according to claim 10, wherein said method is further configured to determine a speed needed for operation of said peripheral device.

16. The method according to claim 10, wherein said peripheral device is further configured to determine a power conservation of said peripheral device.

17. The method according to claim 10, wherein said peripheral device is further configured to switch from a first speed to a second speed in response to a user input.

18. An apparatus comprising:

a peripheral device connected to a host device, wherein a speed of said peripheral device is adjusted in response to one or more predetermined conditions, wherein said peripheral device is further configured to determine a power conservation of said peripheral device.

19. An apparatus comprising:

a peripheral device connected to a host device, wherein a speed of said peripheral device is adjusted in response to one or more predetermined conditions, wherein said peripheral device is further configured to switch from a first speed to a second speed in response to a user input.

* * * * *